US012773813B2

(12) United States Patent
Preau et al.

(10) Patent No.: US 12,773,813 B2
(45) Date of Patent: Oct. 27, 2026

(54) TOOLING AND METHOD FOR MANUFACTURING APERTURED ELEMENTS SUCH AS THRUST REVERSER CASCADES FOR AN AIRCRAFT NACELLE

(71) Applicant: Safran Nacelles, Gonfreville l'Orcher (FR)

(72) Inventors: Mathieu Preau, Moissy Cramayel (FR); Bertrand Desjoyeaux, Moissy Cramayel (FR); Franck Maze, Moissy Cramayel (FR); Mickaël Sorel, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 187 days.

(21) Appl. No.: 18/412,753

(22) Filed: Jan. 15, 2024

(65) Prior Publication Data

US 2024/0367355 A1 Nov. 7, 2024

(30) Foreign Application Priority Data

Jan. 13, 2023 (FR) ...................................... 2300348

(51) Int. Cl.
*B29C 43/36* (2006.01)
*B29C 33/00* (2006.01)
*B29C 33/52* (2006.01)

(52) U.S. Cl.
CPC .......... *B29C 43/36* (2013.01); *B29C 33/0033* (2013.01); *B29C 33/52* (2013.01); *F05D 2240/129* (2013.01)

(58) Field of Classification Search
CPC ..... B29C 43/36; B29C 33/0033; B29C 33/52; F05D 2240/129
See application file for complete search history.

(56) References Cited

U.S. PATENT DOCUMENTS 5,356,692 A * 10/1994 Perez .................... B29C 33/485 428/116
2021/0023745 A1* 1/2021 VanDeMark ......... B29C 33/485
2022/0314558 A1 10/2022 Desjoyeaux et al.

FOREIGN PATENT DOCUMENTS

FR 3105070 6/2021
WO 2021123628 6/2021

OTHER PUBLICATIONS

Search Report issued in corresponding FR Application 2300348, dated Sep. 25, 2023, 2 pages.

* cited by examiner

*Primary Examiner* — Jerzi H Moreno Hernandez
(74) *Attorney, Agent, or Firm* — BURRIS LAW, PLLC

(57) ABSTRACT

Tooling for manufacturing an air deflection cascade for a thrust reverser system of an aircraft nacelle includes a plurality of spars, each spar being connected to at least one adjacent spar by a plurality of deflection vanes. The tooling includes at least one molding bar and at least one molding column of a row of vanes, comprising two opposing lateral faces extending along the longitudinal direction of the tooling, and comprising molding cavities. The tooling includes a fixed structure on which the molding bar and the molding column are mounted. The fixed structure enabling a translational movement, along a transverse direction of the tooling, of the molding bar. The tooling includes a compression device to provide the compression of elements made of a composite material arranged in the tooling and intended to form at least one part of the cascade to be manufactured.

16 Claims, 7 Drawing Sheets

TOOLING AND METHOD FOR MANUFACTURING APERTURED ELEMENTS SUCH AS THRUST REVERSER CASCADES FOR AN AIRCRAFT NACELLE

CROSS-REFERENCE TO RELATED APPLICATIONS

This application claims priority to and the benefit of French patent application FR 23/00348 filed on Jan. 13, 2023. The disclosure of the above application is incorporated herein by reference.

FIELD

The present disclosure relates to tooling for the manufacture of apertured elements such as air deflection cascades for a thrust reverser system for an aircraft nacelle, and also concerns a cascade manufacturing method implementing such tooling.

BACKGROUND

The statements in this section merely provide background information related to the present disclosure and may not constitute prior art.

Aircrafts propelled by at least one propulsion unit comprising a bypass turbojet engine accommodated in a nacelle are known. Each propulsion unit is attached to the aircraft by a mast generally located under or over a wing, or at the level of the fuselage of the aircraft.

A nacelle generally has a tubular structure comprising an air inlet upstream of the turbojet engine, a middle section intended to surround a fan of the turbojet engine, a downstream section intended to surround the combustion chamber of the turbojet engine, and generally terminates in an ejection nozzle whose outlet is located downstream of the turbojet engine.

In some cases, the downstream section integrates a thrust reverser system, or thrust reverser. The role of a thrust reverser is to improve the braking capability of the aircraft by redirecting forwards at least part of the thrust generated by the turbojet engine. To this end, the thrust reverser diverts at least part of the cold flow and/or of the hot flow generated by the turbojet engine, thereby generating a counter-thrust which adds to the braking of the wheels of the aircraft. Among the different thrust reverser systems, systems comprising deflection cascades, also called cascades, are known. Such cascade systems comprise one or several mobile cowl(s) movable between, on the one hand, a deployed position in which they open a passage in the nacelle intended for the diverted flow and, on the other hand, a stowed position in which they close this passage. When the mobile cowl(s) are in the deployed position, they uncover the deflection cascades. Furthermore, a connecting rod system links each mobile cowl to blocking doors which are deployed inside the secondary flow path and block the direct flow outlet. The air flow is then compelled to escape from the nacelle throughout the deflection cascades, which deflect this flow forwards of the aircraft.

An air deflection cascade comprises rows of deflection vanes, each row of vanes being arranged between two adjacent spars extending along a longitudinal direction of the cascade. Within each row, the vanes extend along a direction substantially perpendicular to those of the spars.

Advantageously, the cascades are made of composite materials, in order to make them lighter than metallic cascades. Such cascades are generally manufactured through a manual process of draping numerous pieces of composite fabrics, which is very costly and does not allow obtaining aerodynamic profiles that are really evolutive.

A method for manufacturing cascades made of a composite material is known from the application WO 2021/123628, implementing tooling using a plurality of fusible movable cores, allowing making the cascades by compression of the composite material between the cores, via movable compression devices. This method has however the drawback of using a large number of cores (in general several tens). This uses operations of manufacturing, handling and positioning these cores which are numerous and costly. Moreover, the accumulation of tolerances in positioning the different cores generates a considerable dimensional variability of the obtained cascades. This dimensional variability can affect the aerodynamic performance of the cascades. Moreover, the operations of draping the vanes one by one also uses a considerable number of operations of making preforms, and operations of accurately positioning these preforms on tooling with complex shapes.

SUMMARY

This section provides a general summary of the disclosure and is not a comprehensive disclosure of its full scope or all of its features.

The present disclosure provides tooling and a method for manufacturing apertured elements made of a composite material, such as thrust reverser cascades for an aircraft nacelle, which is less costly than known tooling and methods, and which allows making thrust reverser cascades having geometries suited to the aerodynamic performances of the nacelle in a quick way.

The present disclosure relates to tooling for the manufacture of an air deflection cascade for a thrust reverser system of an aircraft nacelle. The cascade comprises a plurality of spars extending along a longitudinal direction, each spar being connected to at least one adjacent spar by a plurality of deflection vanes. The tooling comprises: at least one molding bar, extending along a longitudinal direction of the tooling; at least one molding column for molding a row of vanes, comprising two opposite lateral faces extending along the longitudinal direction of the tooling, and comprising molding cavities, each cavity opening onto each of the two lateral faces of the molding column, and forming a cavity for molding a vane. The tooling further comprises a fixed structure on which the molding bar and the molding column are mounted. The fixed structure allows a translational movement, along a transverse direction of the tooling, of the molding bar. The tooling further comprises at least one compression device for providing the displacement of the molding bar towards the molding column and the compression of elements made of a composite material arranged in the tooling and intended to form at least one part of the cascade to be manufactured.

Thus, the tooling in accordance with the present disclosure allows making all of the vanes connecting two adjacent spars in one single molding operation, by creeping the material in the molding cavities. Further, by providing a molding column comprising all of the cavities for molding vanes of a row of vanes, the dimensional tolerances are significantly reduced compared to tooling with the set-up of numerous independent movable cores.

The tooling is simple and inexpensive. The arrangement of the material is facilitated by the layout of the tooling with independent molding columns which allows making deflection cascades having geometries suited to the desired aerodynamic performances, because each row of vanes is made via one single molding column. The implementation of the compression is simplified since the latter is performed along one single direction, for example, along the transverse direction of the tooling.

Furthermore, such tooling allows the application of high pressures on the material intended to form at least partially the cascade to provide spreading and distribution thereof within the portions of the tooling forming a molding cavity, and in particular in the molding cavities.

According to other features of the present disclosure, the tooling of the present disclosure comprises one or more of the following optional features, considered separately or according to any possible combination.

According to one feature, the tooling comprises at least two adjacent molding columns, each molding column being movable in translation, along a transverse direction of the tooling, over the fixed structure of the tooling. The tooling further comprises a second molding bar, the two molding bars being arranged on either side of the assembly formed by the molding columns.

According to one feature, the second molding bar is mounted movable in translation, along a transverse direction of the tooling. The tooling comprises a second compression device providing the displacement of the second molding bar.

According to one feature, the second molding bar is fixed with respect to the fixed structure.

According to one feature, each molding column may be alternately set in a fixed configuration, in which each molding column is fixed with respect to the fixed structure of the tooling, and in a movable configuration, in which each molding column is movable in translation, in which each molding column is movable in translation, along a transverse direction of the tooling, relative to the fixed structure.

According to one feature, each molding column comprises between 8 and 16 cavities.

According to one feature, each molding column is made by assembling at least two subassemblies, each subassembly comprising for example between 4 and 8 cavities.

According to one feature, the tooling comprises between 4 and 8 molding columns.

According to one feature, each molding column is rigid.

According to one feature, the molding cavities of each molding column are non-deformable.

According to one feature, each molding column is made of a fusible material.

According to one feature, the tooling comprises a guide system, comprising, for example, rails, providing guidance of the movable elements of the tooling in their displacement.

According to one feature, each molding column of the tooling comprises a flange molding cavity, to make a part of an end of the cascade such as a flange for fastening the cascade.

The present disclosure also relates to a method for manufacturing a thrust reverser cascade for an aircraft nacelle, by compression molding in tooling as described hereinabove. The tooling comprises as many molding columns as the cascade to be manufactured comprises rows of vanes and comprises two molding bars. The method comprises the following steps: a step of arranging elements made of a composite material, during which at least one first element intended to form at least partially a spar of the cascade and second elements are arranged on either side of each molding column, each second element being intended to form at least partially a vane of the cascade and being arranged opposite a respective cavity of a molding column; a compression step, during which a force is applied on at least one of the molding bars, so as allow bringing together all of the molding columns and the molding bars, and so as to enable the compression of the elements made of a composite material enough for each second element to creep in the respective cavity; a consolidation step, during which the elements made of a composite material partially or totally harden; and a step of demolding the cascade thus formed.

The present disclosure also relates to a method for manufacturing a thrust reverser cascade for an aircraft nacelle, by compression molding in tooling as described hereinabove. The tooling comprises as many molding columns as the cascade to be manufactured comprises rows of vanes and comprises two molding bars. The method comprises the following steps: a step of arranging elements made of a composite material, during which at least one first element intended to form at least partially a spar of the cascade and second elements are arranged on either side of a molding column, each second element being intended to form at least partially a vane of the cascade and being arranged opposite a respective cavity of the molding column; a compression step, during which a force is applied on at least one of the molding bars, so as allow bringing together the molding bar and the adjacent molding column, or two adjacent molding columns, and so as to enable a compression of the elements made of a composite material enough for each second element to creep in the respective cavity: a consolidation step, during which the elements made of a composite material partially or totally harden; the material arrangement, compression and consolidation steps being successively repeated for each adjacent column, so as to add, each time, at least one spar and at least one row of vanes to the part being manufactured, until the latter comprises all of the spars and the rows of vanes of the cascade to be manufactured; a step of demolding the cascade thus formed.

The above-described methods allow manufacturing thrust reverser cascades for an aircraft nacelle having geometries suited to the desired aerodynamic performances, thanks to a method that is simpler and less expensive than the methods of the prior art.

According to other features of the present disclosure, each of the methods in accordance with the present disclosure may comprise one or more of the following optional features, considered separately or according to any possible combination.

According to one feature, for each of the methods hereinabove, the demolding step may comprise the elimination of the molding columns, in particular by total or partial melting of each molding column.

According to one feature, the elements made of a composite material comprise a pre-impregnated composite material, comprising fibers and resin.

According to another feature, the elements made of a composite material comprise a resin-free fibrous structure.

According to this feature, during the compression step, a resin in a liquid form is introduced to impregnate the fibrous structure.

According to another feature, the elements made of a composite material comprise a pre-impregnated composite material, and during the compression step, more resin is introduced in the liquid form in order to impregnate the elements made of a composite material.

According to one feature, the compression step is carried out until obtaining a compression between 5 and 70% of the material intended to form at least partially the apertured element.

According to one feature, the method(s) comprise(s) a heating step during which the tooling is heated to soften the material intended to form at least partially the apertured element, prior to the compression step.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
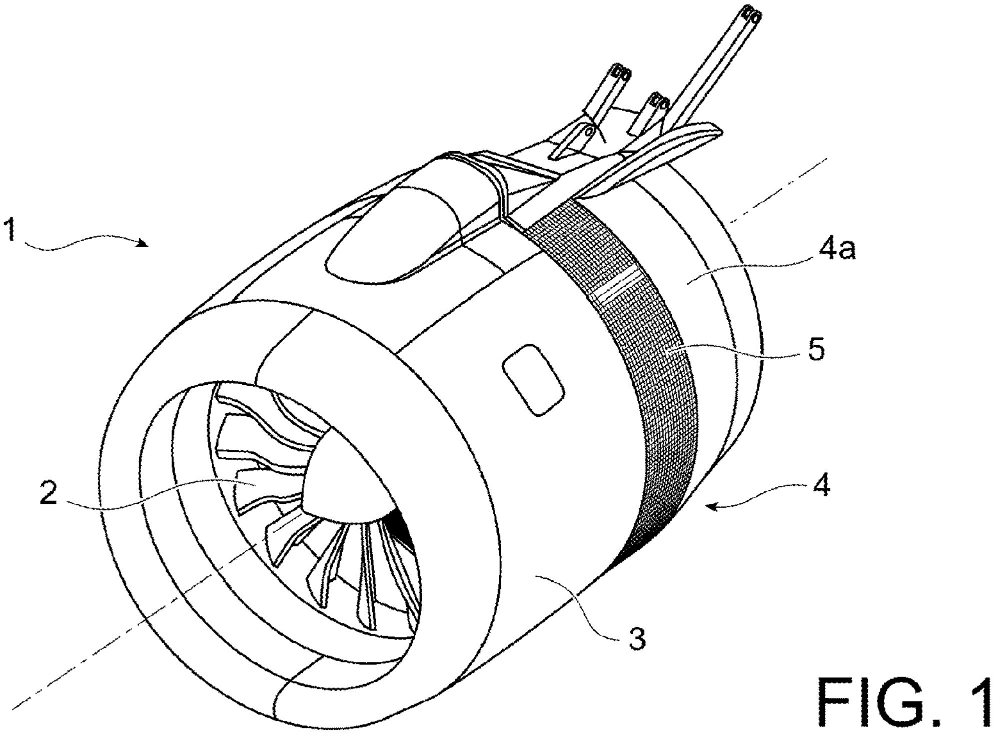
FIG. 1 is a perspective view of a propulsion unit for an aircraft, comprising a turbojet engine and a nacelle embedding a cascade thrust reverser system, the thrust reverser system being represented in a deployed configuration according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
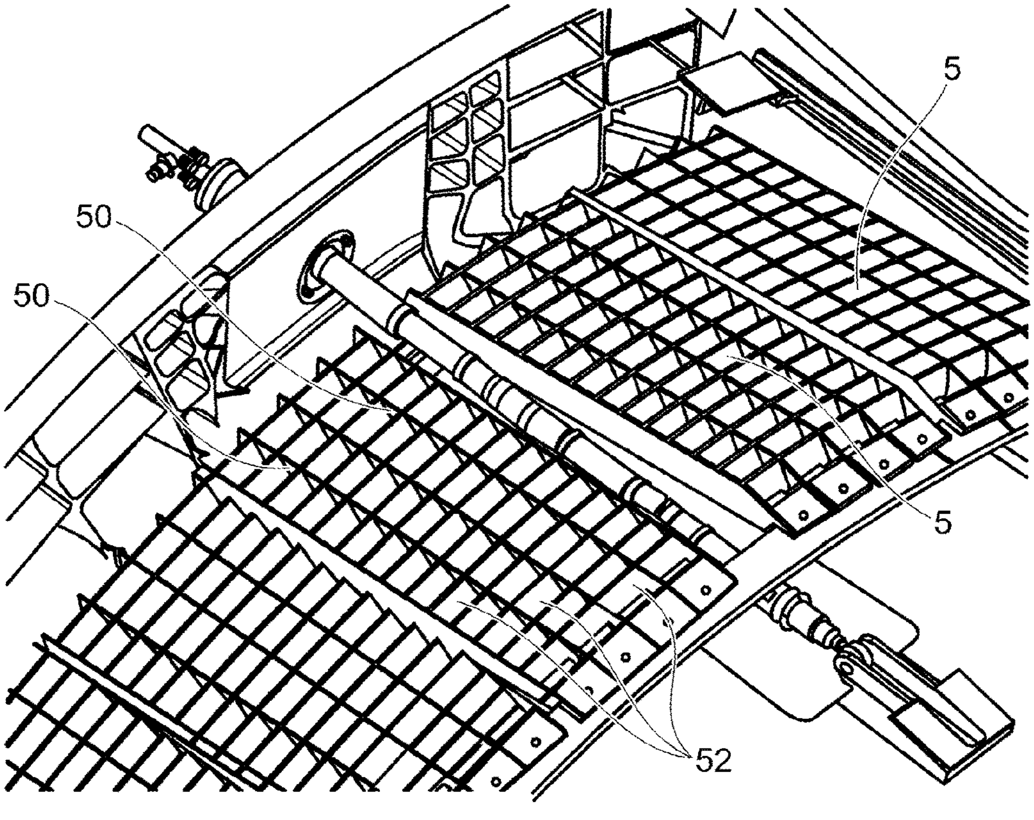
FIG. 2 is a partial perspective view of the thrust reverser system of the propulsion unit of FIG. 1, showing several deflection cascades according to the present disclosure.

FIG. 1 represents an aircraft propulsion unit 1 comprising a bypass turbojet engine 2, and a nacelle 3 embedding a thrust reverser system 4 with deflection cascades. In particular, the thrust reverser system 4 comprises a movable outer structure 4*a*, comprising two movable cowls in the example. The outer structure 4*a* is movable between a closure position, in which the thrust reverser system 4 is inactive, and an opening position, in which the thrust reverser system 4 is active. In the deployed position, the outer structure 4*a* uncovers a set of deflection cascades 5, through which the redirected air escapes from the nacelle 3. Cascades 5 are best visible in the detail view of FIG. 2. Each cascade 5 comprises spars 50, elongated along a longitudinal direction of the cascade 5, and deflection vanes 52 (or diverting vanes), each deflection vane 52 joining two adjacent spars 50. The vanes 52 extend between two adjacent spars 50 along a direction substantially perpendicular to the longitudinal direction of the cascade 5. Advantageously, such cascades 5 are made of a composite material, for example a material comprising a reinforcement comprising carbon fibers and a matrix comprising a resin. The tooling and the methods described hereinafter are particularly suited for the manufacture of apertured elements such as the cascades 5 of FIGS. 1 and 2.

Figure 3:
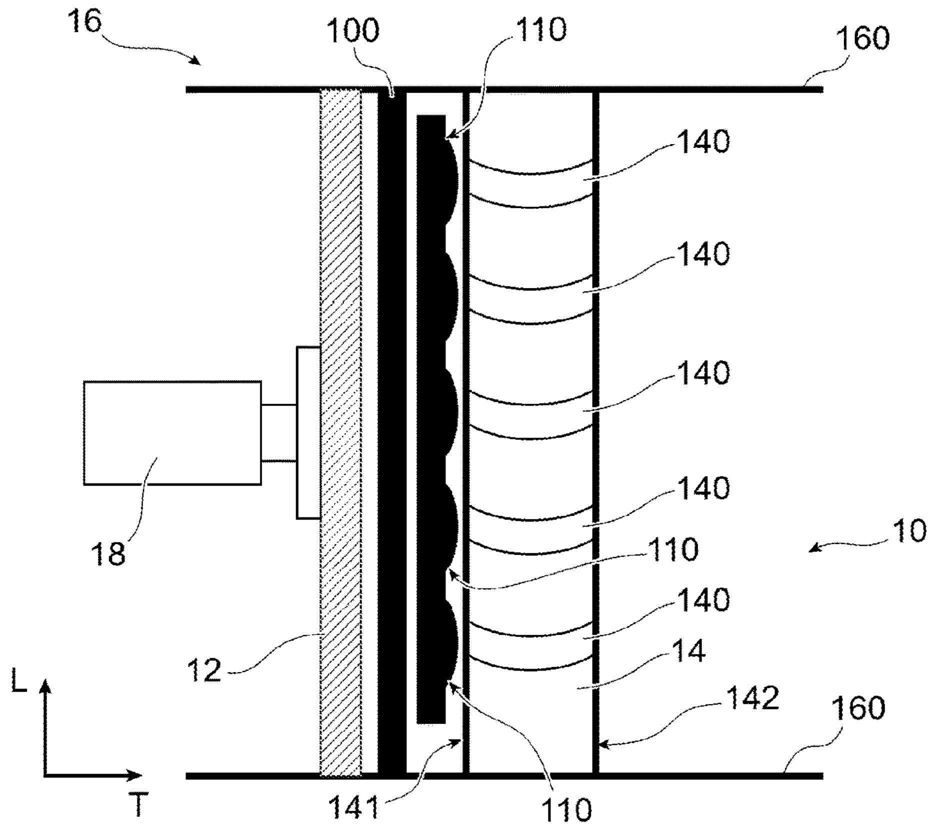
FIG. 3 is a schematic view of tooling in accordance with the present disclosure, represented before implementing a compression step.

FIG. 3 illustrates one form of tooling 10 in accordance with the present disclosure, allowing manufacturing apertured elements such as cascades 5. As shown in FIG. 3, the tooling 10 comprises at least one bar 12 for molding a spar and at least one molding column 14 for molding vanes 52, these elements being viewed in section.

The molding bar 12 is intended for molding one of the spars 50 forming the cascade 5 and extends along a longitudinal direction L of the tooling 10.

The molding column 14 is intended for the simultaneous molding of several vanes 52 joining two adjacent spars 50 of the cascade 5. To this end, the molding column 14 comprises a plurality of molding cavities 140, each cavity 140 forming a cavity intended to form a vane 52 of the cascade 5. The cavities 140 are arranged along the longitudinal direction of the tooling 10 and extends through the molding column 14 along a transversal direction of the tooling 10. Thus, each cavity 140 opens on either side of the molding column 14, at the level of opposite lateral faces 141, 142 of the molding column 14. The molding column 14 is rigid, i.e. non-deformable. Thus, each cavity 140 is non-deformable and has a fixed volume. Similarly, the distance between the cavities 140 within the molding column 14 is fixed.

Figure 4:
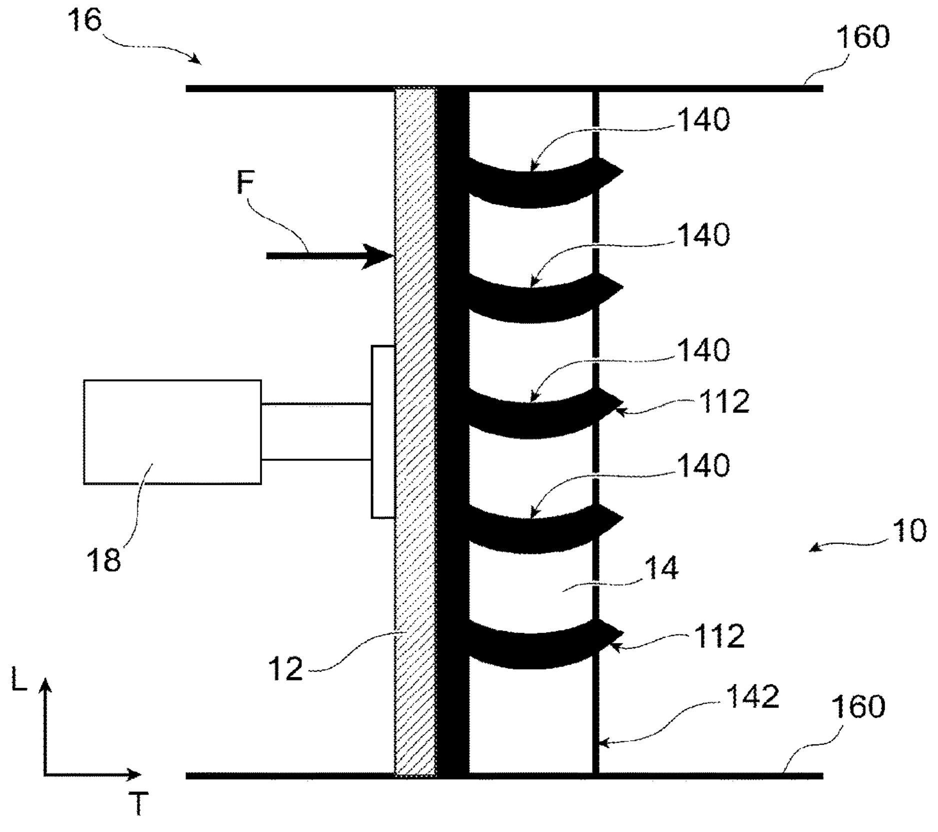
FIG. 4 is a schematic view of the tooling of FIG. 3, after implementation of a compression step according to the present disclosure.

The tooling 10 is configured to enable a relative displacement of the molding bar 12 and of the molding column 14 along a transverse direction T of the tooling 10. To this end, at least one of these two elements is movable in translation along the transverse direction T of the tooling 10, relative to a fixed structure 16 of the tooling 10. In the example, the fixed structure 16 comprises rails 160. The molding bar 12 and/or the molding column 14 are mounted movable in translation on the rails 160. The tooling 10 further comprises a compression device 18 providing the relative displacement of the molding bar 12 and of the molding column 14, so as to bring together these two elements. In the example of FIGS. 3 and 4, the molding column 14 is fixed with respect to the fixed structure 16, whereas the molding bar 12 is movable relative to the fixed structure 16, and in particular movable in translation along the rails 160.

The tooling 10 represented in FIGS. 3 and 4 allows carrying out the molding of a part of the cascade 5, the part comprising at least one spar 50 and at least a part of the vanes 52 connected to this spar 50.

As shown in FIG. 3, a first element 100 comprising a material intended to form, at least partially, the spar 50 has been arranged between the molding bar 12 and the molding column 14. On this first element 100, a second element 110 has been arranged with regard to each cavity 140 of the molding column 14, comprising a material intended to form, at least partially, a vane 52, by creeping in the corresponding cavity 140.

As shown in FIG. 4, after compression of the first and second elements 100, 110 via the compression device 18, all of the second elements 110 have creeped in the cavities 140. Thus, each second element 110 has taken the shape complementary to the corresponding cavity 140, i.e. the shape of one of the vanes 52 of the cascade 5. After consolidation, the molded assembly shown in FIG. 4 can be secured to another spar 50 manufactured or being manufactured according to the same method.

Figure 5:
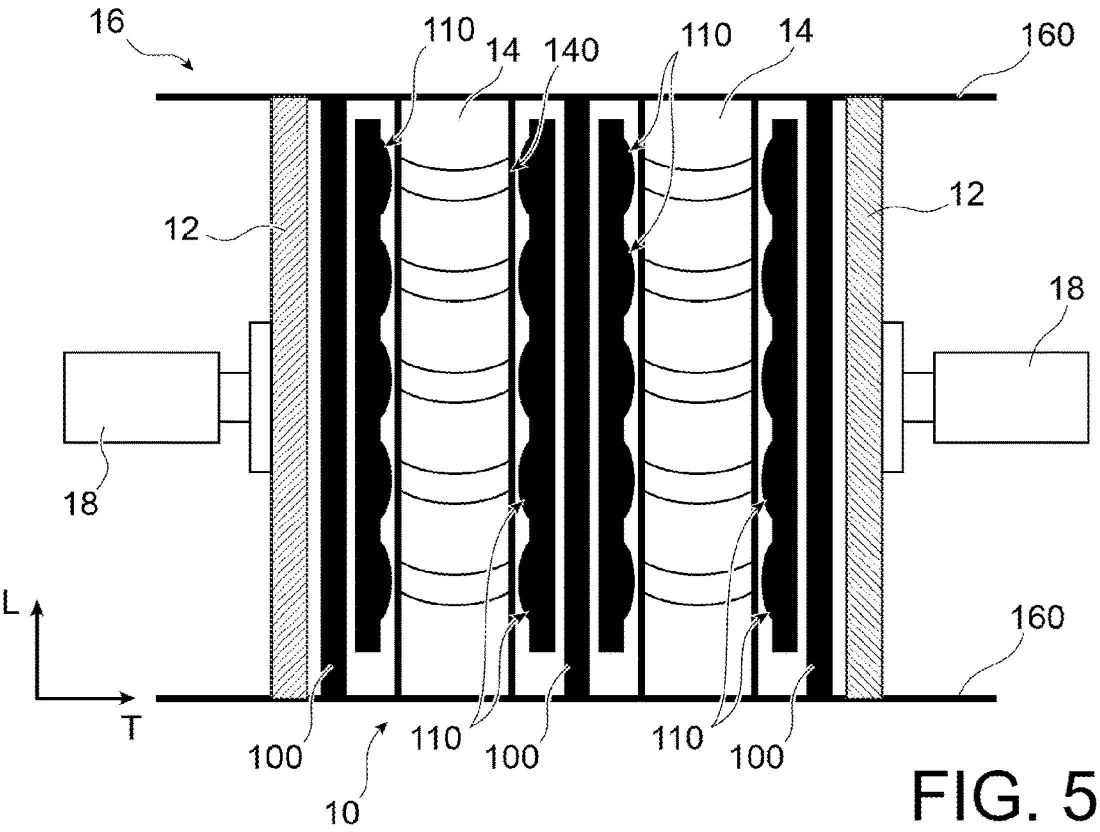
FIG. 5 is a schematic view of tooling in accordance with the present disclosure comprising several molding columns, before implementing a compression step.
Figure 6:
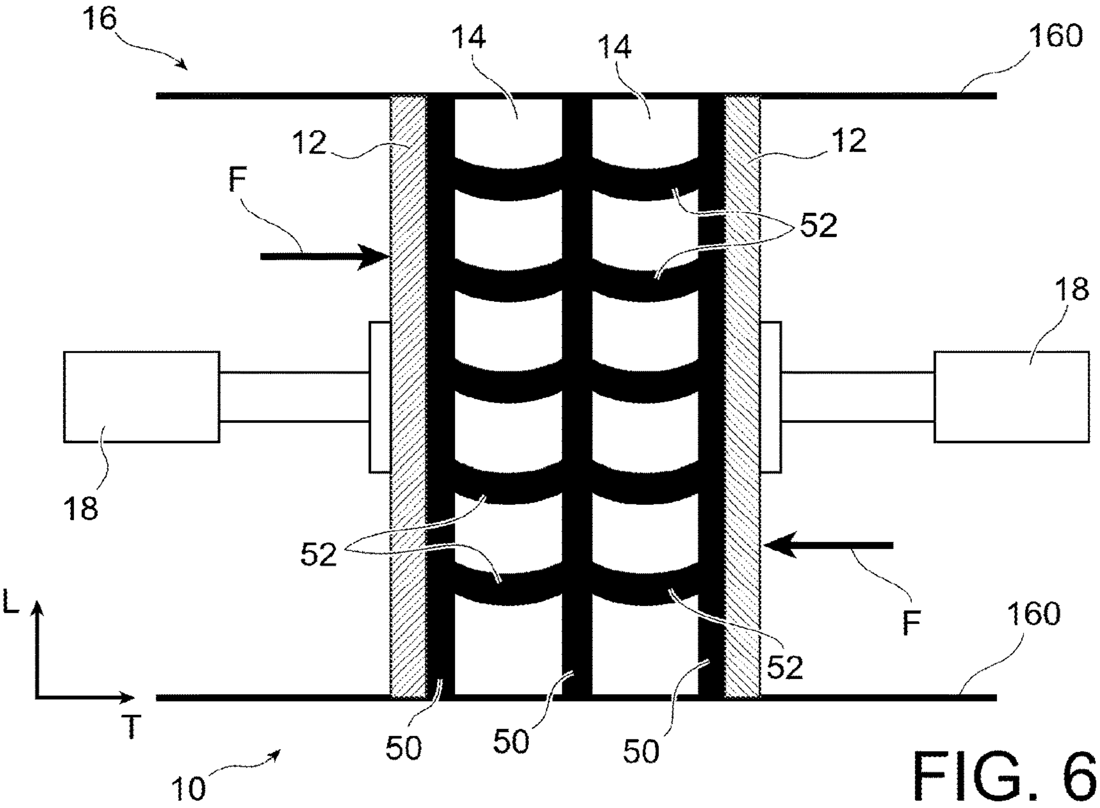
FIG. 6 is a schematic view of the tooling of FIG. 5, after implementation of a compression step according to the present disclosure.

FIGS. 5 and 6 show an example of tooling 10 comprising two molding bars 12 and two molding columns 14. Each of the two molding bars 12 and of the molding columns 14 is movable in translation, along the transverse direction T of the tooling 10, relative to the fixed structure 16. The molding bars 12 are arranged on either side of the two molding columns 14. The tooling 10 comprises two compression devices 18 arranged opposite one another, each compression device 18 causing the displacement of a respective molding bar 12. Alternatively, one form provides one single compression device 18 configured to displace one of the molding bars 12, the other molding bar 12 being fixed with respect to the fixed structure 16 of the tooling 10.

The tooling 10 of FIGS. 5 and 6 enables the simultaneous making of two adjacent rows of vanes 52 in one molding operation by implementing creeping of the material of the second elements 110 within the cavities 140 as disclosed above. This operation allows making the spar 50 separating the two rows of vanes 52, and also making all or part of the two spars 50 surrounding these two rows of vanes 52. As shown in FIG. 5, the material initially arranged in the tooling 10 comprises three first elements 100, each comprising a material intended to form at least partially a spar 50, and comprises, on either side of each molding column 14, second elements 110, intended to form at least partially the vanes 52. After compression, as shown in FIG. 6, a subassembly is obtained which comprises three spars 50 and two rows of vanes 52. Afterwards, this subassembly may be secured to another subassembly, obtained in a similar way. In the example of FIGS. 5 and 6, second elements 110 are arranged on either side of each molding column 14. Thus, during the compression, the second elements 110 located opposite the same molding cavity 140 will creep in the cavity 140 until joining one another so as to form together the corresponding vane 52, as shown in FIG. 6. Alternatively, one could provide for second elements 110 being arranged on only one side of each molding column 14, the second elements 110 being similar to those represented in FIGS. 3 and 4, and being therefore configured to creep in each respective cavity 140 so as to entirely form the corresponding vane 52.

Alternatively, the tooling 10 represented in FIGS. 5 and 6 may comprise more than two molding columns 14 arranged between the two molding bars 12, for example between 3 and 8 molding columns 14. Thus, the tooling 10 may comprise a number of molding columns 14 to make an entire cascade 5 in one single molding operation, the obtained cascade 5 comprising, for example, between 3 and 8 rows of vanes 52.

Figure 7:
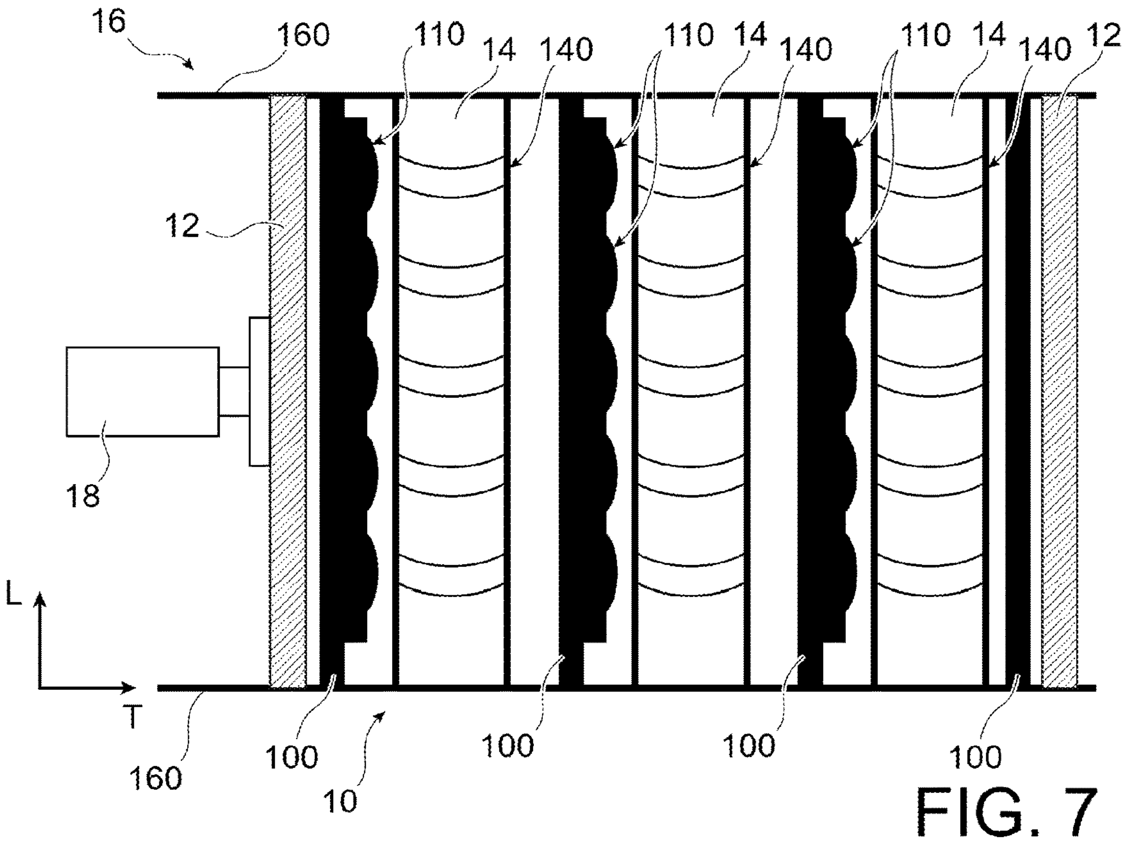
FIG. 7 is a partial schematic view of tooling in accordance with the present disclosure comprising several molding columns, and allowing a sequential use of the molding columns.

FIG. 7 shows tooling 10 to make a cascade 5 in a sequential manner. The tooling 10 comprises a number of molding columns 14 equal to the number of rows of vanes 52 of the cascade 5 to be manufactured, for example between 3 and 8 molding columns 14 (three columns 14 being represented in FIG. 7). The tooling 10 comprises two molding bars 12 arranged on either side of the assembly formed by the molding columns 14. One of the molding bars 12 is movable and able to be displaced by the compression device 18, whereas the second molding bar 12 is fixed with respect to the fixed structure 16 of the tooling 10. Each molding column 14 has two configurations: a first configuration, or movable configuration, in which the molding column 14 is movable relative to the fixed structure 16 of the tooling 10; and a second configuration, or fixed configuration, in which the molding column 14 is fixed with respect to the fixed structure 16 of the tooling 10.

Each column 14 may be alternately set in either one of these two configurations, independently of the other molding columns 14.

The tooling 10 may be implemented sequentially, i.e. the molding columns 14 are successively used, one after another, to form a row of vanes 52 at each subsequent molding operation. Thus, a first molding operation will be implemented to make or consolidate a first spar 50 (i.e. the external spar located close to the movable molding bar 12), and the first row of vanes 52 adjacent to this first spar 50, via the first molding column 14 (that one adjacent to the movable molding bar 12). During this first molding operation, the first molding column 14 is in the fixed configuration, in which the first molding column 14 is fixed with respect to the fixed structure 16, so as to enable the compression of the material during the displacement of the movable molding bar 12.

During a second molding operation, the subassembly formed by the first spar 50 and the first row of vanes 52 is secured to the adjacent spar 50, at the same time as the second row of vanes 52 is formed via the second molding column 14, adjacent to the first molding column 14. During this second molding operation, the second molding column 14 is in a fixed configuration, whereas the first molding column 14 is in a movable configuration, so as to be displaced with the movable molding bar 12 during the compression of the material.

At each subsequent molding operation, the next adjacent molding column 14 is used, until the last molding column 14, that one adjacent to the second molding bar 12 which allows making the last spar 50.

During each molding operation, the formation of the vanes 52 is carried out so that the material creeping in the cavities 140 could creep up to the outside of each corresponding cavity 140 and form a projecting element 112 (as shown in FIG. 4), all of the projecting elements 112 then being secured to the adjacent spar 50 during the subsequent molding operation.

Similar to the tooling 10 of FIG. 6, the tooling 10 of FIG. 7 may also be implemented in a simultaneous manner (not sequential), i.e. so as to make an entire cascade 5 in one single molding operation. Thus, all of the spars 50 and the vanes 52 of the cascade 5 are formed in one single molding operation. In this case, all of the material intended to form the cascade 5, including the first elements 100 and the second elements 110, are arranged in the tooling 10 (between two adjacent molding columns 14 or between one of the molding bars 12 and the adjacent molding column 14). All of the molding columns 14 are in the movable configuration. Then, all of the material intended to form the cascade 5 is compressed, by displacement of the movable molding bar 12. Alternatively, the two molding bars 12 may be movable, and the compression is obtained by displacement of the two molding bars 12 towards one another.

Figure 8:
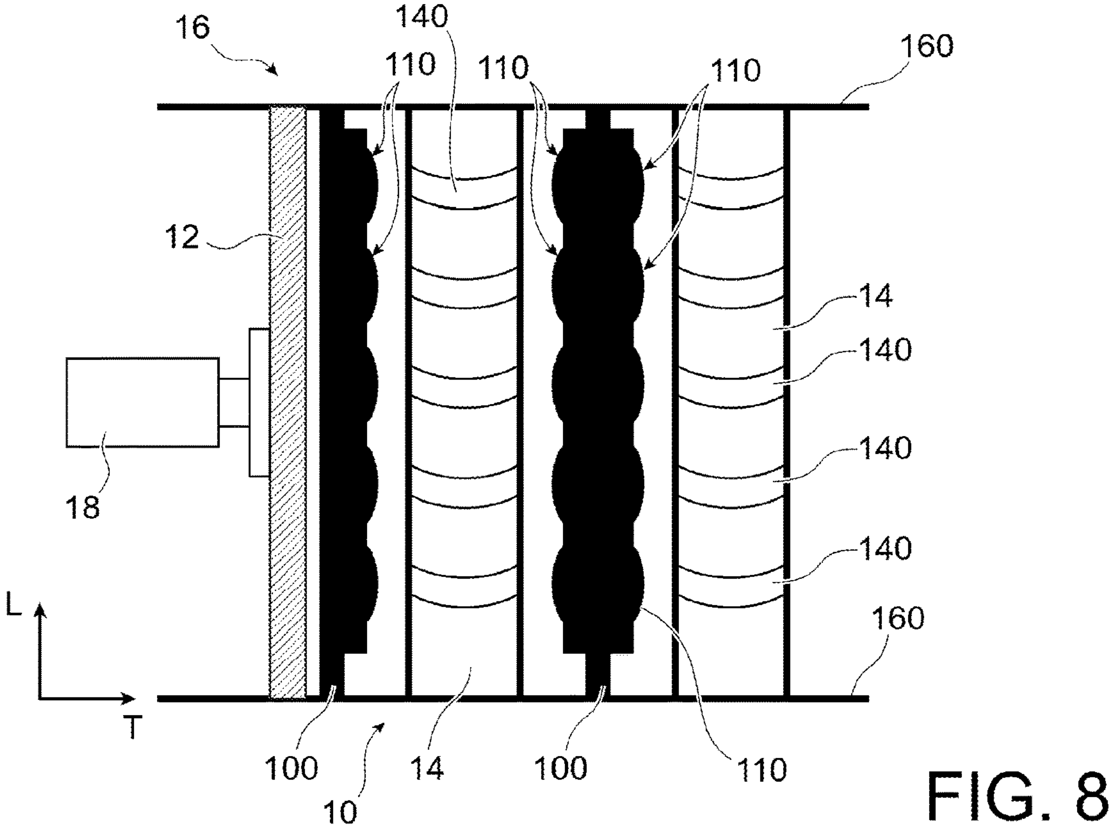
FIG. 8 is a schematic view of the tooling of FIG. 7, with an alternative arrangement of the material intended to form the apertured element according to the present disclosure.

The sequential implementation described hereinabove with reference to FIG. 7 may be carried out in a different way. Indeed, as shown in FIG. 8, to the present disclosure can provide that, during the first molding operation, the material creeps in the cavities 140 of the first molding column 14 so as to form only a part of each vane 52, for example about half the vane 52. In this case, during the second molding operation, a part of the material arranged between the first and second molding columns 14 will creep in the cavities 140 of the first molding column 14 so as to complete all of the vanes 52, whereas a second part of this material will creep in the cavities 140 of the second column 14, so as to partially fill these, like in the first molding operation. This manner for making a complete vane 52 via two second elements 110 creeping in opposite directions and joining each other within the corresponding cavity 140 may also be used in the context of the above-disclosed simultaneous implementation. In this case, the arrangement of the second elements 110 is similar to that one described with reference to FIG. 5.

Figure 9:
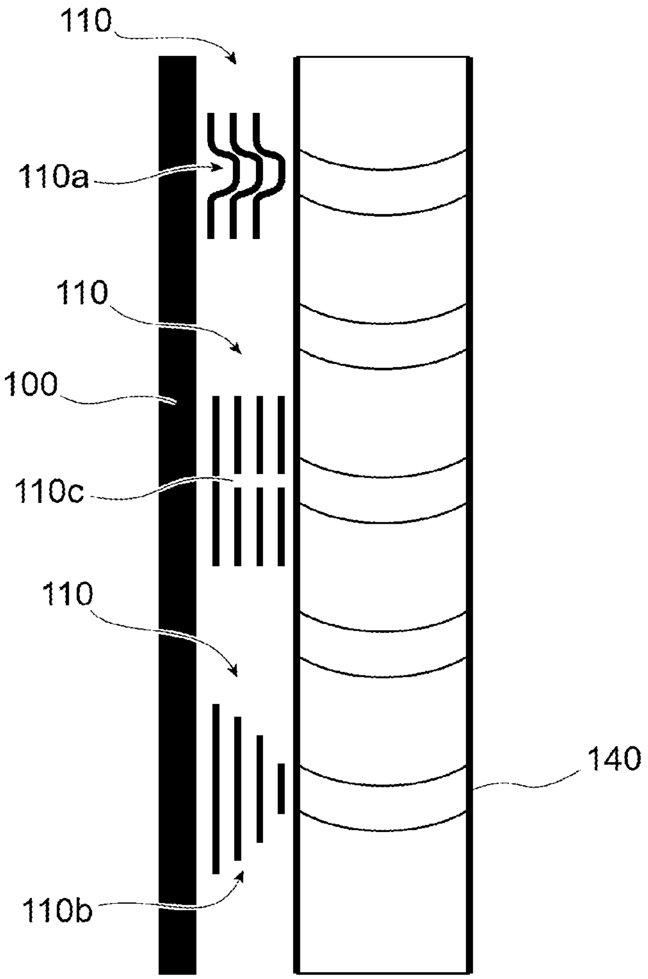
FIG. 9 is a partial schematic view of a molding column illustrating examples of the arrangement of the material intended to form the apertured element according to the present disclosure.
Figure 10:
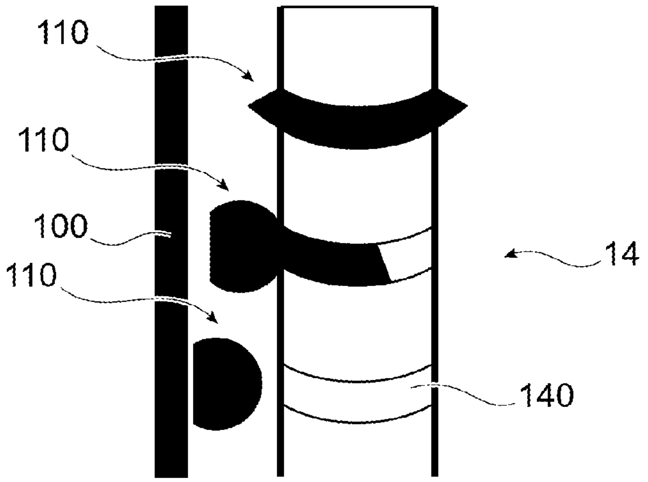
FIG. 10 is a partial schematic view of a molding column illustrating examples of the arrangement of the material intended to form the apertured element according to the present disclosure.

FIGS. 9 and 10, represent different ways of arranging the material intended to creep in the cavities 140, so as to facilitate creeping to obtain an optimum filling of each cavity 140. In FIGS. 9 and 10, a first element 100 is provided and is intended to form at least partially a spar 50, and three examples of arrangement of a second element 110, intended to form at least partially a vane 52.

In FIG. 9, a first example of arrangement of the second element 110 consists in providing for several pleats 110*a*, to obtain a shape of the second element 110 facilitating penetration thereof in a cavity 140 of a molding column 14. A second example of arrangement of the second element 110 consists in making a stack 110*b* of plies with different sizes, so that the surface of the plies decreases when getting away from the first element 100. Such an arrangement also promotes the penetration of the second element 110 in the corresponding cavity 140. A third example of arrangement of the second element 110 consists of making a stack of plies and performing a laceration 110*c* of this arrangement opposite the corresponding cavity 140. Such an arrangement considerably promotes the penetration of the second element 110 into the corresponding cavity 140.

In FIG. 10, a fourth example of arrangement of the second element 110 consists of providing for a second element 110 which is configured to be entirely inserted into the corresponding cavity 140 beforehand, with portions projecting on either side of the cavity 140. A fifth example of arrangement of the second element 110 consists in implementing a second element 110 which is configured to be partially inserted into the corresponding cavity 140. A sixth example of arrangement of the second element 110 consists in providing for an element whose shape promotes penetration thereof into the corresponding cavity 140, for example a conical, pyramidal, hemispherical shape, etc.

It should be noted that, regardless of the form of the tooling 10, the compression is carried out by displacement of the movable element(s) of the tooling 10 (i.e. of the molding bar(s) 12 and, where appropriate, of the molding columns 14) along a unique direction, in the example, the transverse direction of the tooling 10. In one variation, the compression direction is parallel to the general direction of creeping of the material in the molding cavities 140 of the molding column(s) 14.

As mentioned hereinabove, the molding column(s) 14 are rigid, i.e. non-deformable. Hence, the molding columns 14 cannot deform during the implementation of the compression within the tooling 10. Thus, the molding cavities 140 keep fixed shape and volume during the implementation of the compression within the tooling 10, and therefore upon creeping of the material within these cavities 140.

Regardless of the form of the considered tooling 10, the molding columns 14 are rigid and are for example configured to be dismountable in order to enable demolding of the apertured element to be manufactured.

Alternatively, the molding columns 14 are rigid and made, at least partially, of a fusible material, so as to be eliminated by melting, as will be described later on. To this end, the molding columns 14 may be made of a low-melting point metal alloy, with a melting point higher than the temperature to consolidate by thermocompression apertured elements to be manufactured. In another variant used alternatively or complementarily, all or part of the molding columns 14 are soluble. To this end, the molding columns 14 are mode of a material that is not soluble with the material of the apertured elements to be manufactured but soluble by a solvent compatible with the material of the apertured elements to be manufactured once the latter has consolidated enough.

Figure 11:
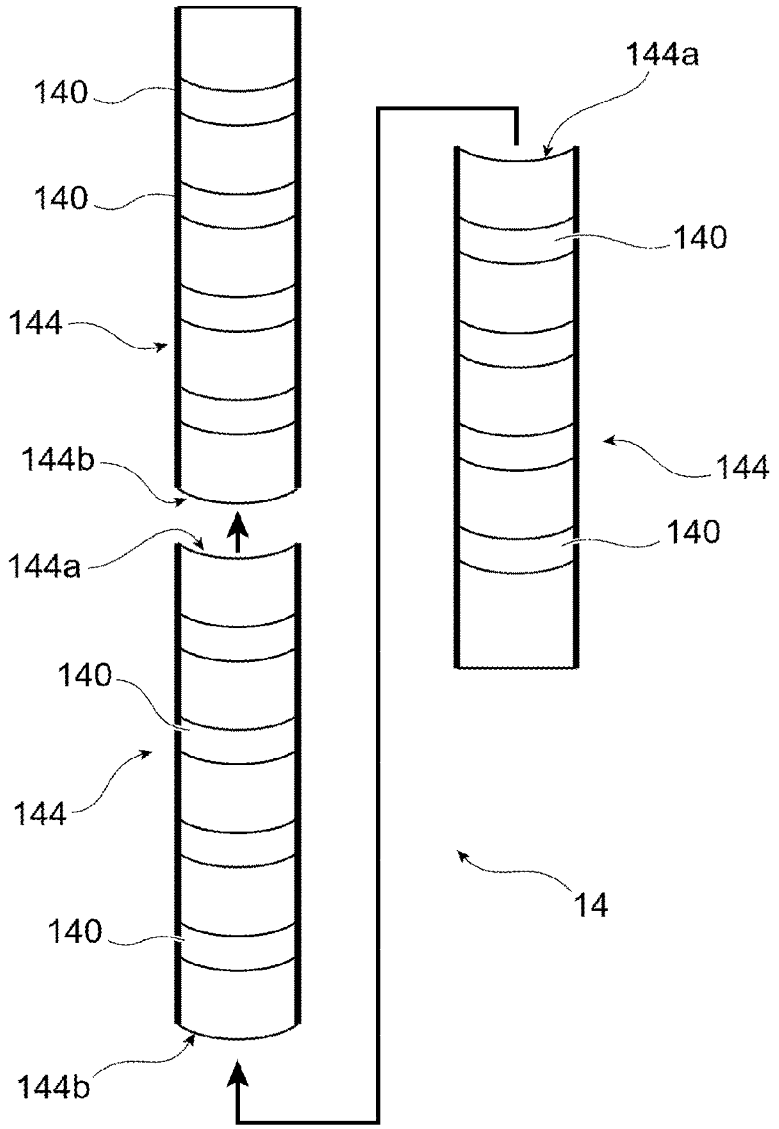
FIG. 11 is a schematic view showing a molding column comprising several subassemblies according to the present disclosure.

Advantageously, as shown in FIG. 11, a molding column 14 may advantageously be made by assembling several subassemblies 144, each subassembly 144 comprising several cavities 140. In the example, a molding column 14 comprising twelve molding cavities 140 is made by assembling three subassemblies 144 each comprising four cavities 140. In order to make an accurate assembly, the subassemblies 144 may comprise at either one or both of their ends a shape 144*a*, 144*b* complementary to that of the corresponding end of the adjacent subassembly 144.

Figure 12:
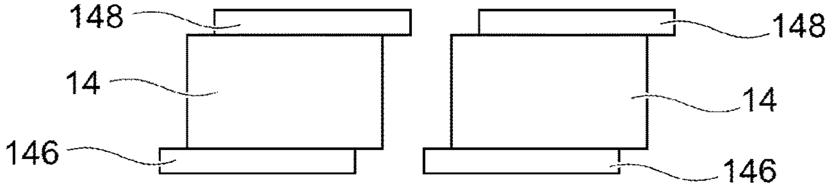
FIG. 12 is a schematic view of two adjacent molding columns according to the present disclosure.
Figure 13:
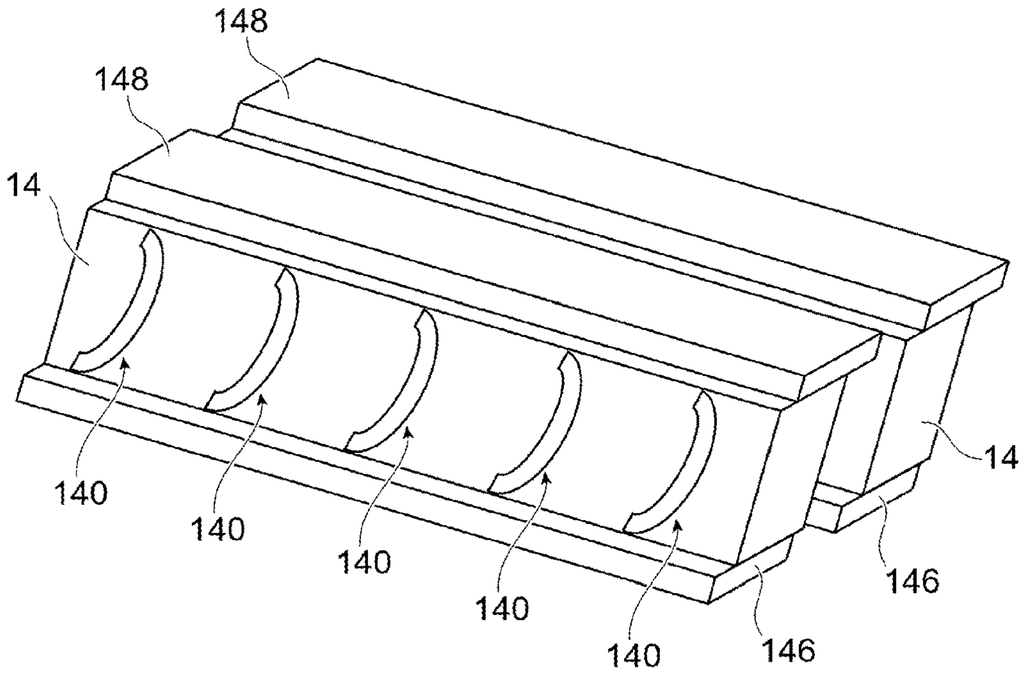
FIG. 13 is a perspective view illustrating the two molding columns of FIG. 12 according to the present disclosure.

Advantageously, as shown in FIGS. 12 and 13, the molding columns 14 may comprise positioning elements 146, 148 to provide an accurate positioning between two adjacent molding columns 14 during a compaction step bringing together these two molding columns 14. In the example of FIGS. 12 and 13, the positioning elements 146, 148 comprise a first sole 146, or lower sole, and a second sole 148, or upper sole, the soles 146, 148 extending along the longitudinal direction of the tooling 10, and being offset along the transverse direction of the tooling 10, identically for each molding column 14. This configuration allows achieving an accurate positioning by nesting together the adjacent molding columns 14.

Advantageously, each molding column 14 of the tooling 10 comprises a flange molding cavity (not represented), to make, by creeping in the cavity, a part of a fastening flange of the cascade 5.

Figure 14:
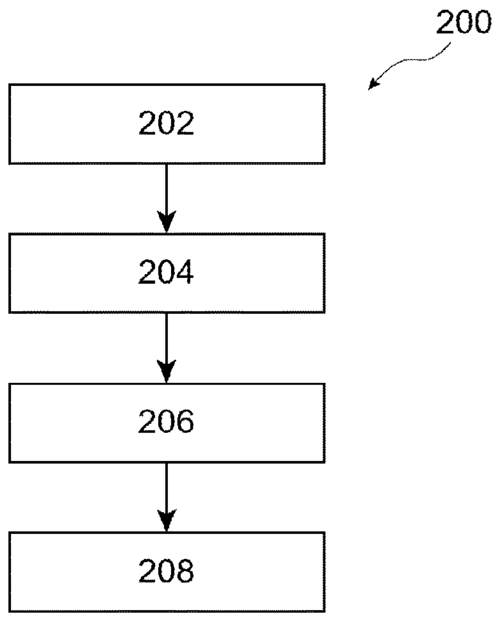
FIG. 14 is a diagram illustrating the steps of a first method in accordance with the present disclosure.
Figure 15:
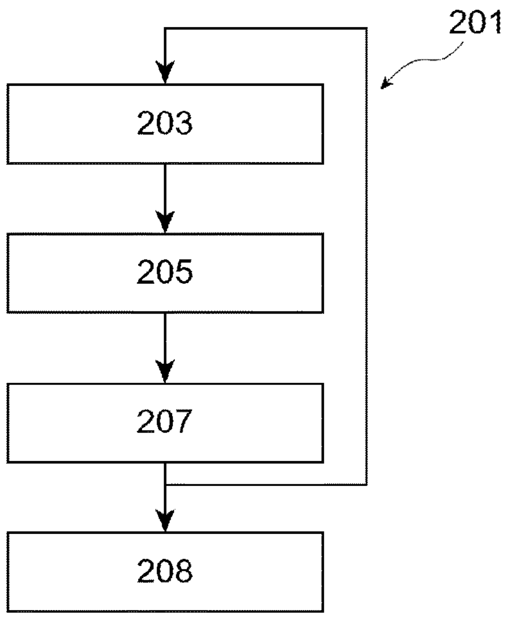
FIG. 15 is a diagram illustrating the steps of a second method in accordance with the present disclosure.

FIGS. 14 and 15 represent the implementation steps of methods in accordance with the present disclosure, these methods implementing tooling 10 in accordance with the present disclosure.

FIG. 14 represents the implementation steps of a method 200 for manufacturing a cascade 5, implementing tooling 10 similar to that of FIGS. 5 and 6, and comprising as many molding columns 14 as the cascade 5 to be manufactured comprises rows of vanes 52.

The method 200 comprises a step 202 of arranging a material 100, 110 intended to form at least partially the cascade 5, during which at least one first element 100 intended to form at least partially a spar 50 of the cascade 5 and second elements 110 are arranged on either side of each molding column 14, each second element 110 being intended to form at least partially a vane 52 of the cascade 5 and being arranged opposite a respective cavity 140 of a molding column 14.

The method 200 comprises a compression step 204, during which a force F is applied on at least one of the molding bars 12, to bring together all of the molding columns 14 and the molding bars 12, and thus the compression of the material intended to form at least partially the cascade 5. The compression step 204 is carried out via the compression device(s) 18.

The method 200 comprises a consolidation step 206, during which the material intended to form, at least partially, the cascade 5 partially or totally hardens.

The method 200 comprises a step 208 of demolding the cascade 5 thus formed.

FIG. 15 represents the implementation steps of a method 201 for manufacturing a cascade 5, implementing tooling 10 similar to that of FIGS. 7 and 8, and comprising as many molding columns 14 as the cascade 5 to be manufactured comprises rows of vanes 52.

The method 201 comprises a step 203 of arranging a material 100, 110 intended to form at least partially the cascade 5, during which at least one first element 100 intended to form at least partially a spar 50 of the cascade 5 and second elements 110 are arranged on one side of a molding column 14, each second element 110 being intended to form at least partially a vane 52 of the cascade 5 and being arranged opposite a respective cavity 140 of the molding column 14.

The method 201 comprises a compression step 205, during which a force F is applied on at least one of the molding bars 12, to bring together the molding bar 12 and the molding column 14, and thus the compression of the material intended to form, at least partially, the cascade 5.

The method 201 comprises a consolidation step 207, during which the material intended to form, at least partially, the cascade 5 partially or totally hardens.

The material arrangement, compression and consolidation steps 203, 205, 207 are successively repeated for each next adjacent column 14, so as to add, each time, at least one spar 50 and at least one row of vanes 52 to the part being manufactured, until the latter comprises all of the spars 50 and the rows of vanes 52 of the cascade 5 to be manufactured.

Afterwards, the method 201, as well as the method 200, comprises a step 208 of demolding the cascade 5 thus formed.

The demolding step 208 may comprise, for either one or both of the methods 200, 201, the elimination of the molding columns 14, in particular by total or partial melting of each molding column 14.

In one variation, the composite material constituting the different elements to be molded, comprising the first elements 100 and the second elements 110, is a pre-impregnated composite material. For example, the material comprises a thermosetting or thermoplastic resin and fibers, such as carbon fibers.

The resin of the pre-impregnated composite material may be raw, or partially or totally cross-linked. In particular, the resin contained in the first element 100 may be partially cross-linked, so that this element is partially consolidated before being secured to the second elements 110, during the step of forming the corresponding row of vanes 52.

Advantageously, the pre-impregnated composite material comprises continuous fibers and/or discontinuous fibers, such as carbon, glass, aramid, nylon or polyester fibers.

During each compression and/or consolidation step, an optional heating step may be implemented, in particular to soften the resin of the pre-impregnated composite material.

The consolidation or hardening of the final part is obtained by temperature maintenance and then cooling according to the values and durations suited to the used resin. A thrust reverser cascade 5 for a nacelle 3 is then obtained by demolding of the consolidated composite material and extraction of the tooling 10 elements. Finishing and machining operations may also be carried out.

In the case where the molding columns 14 are partially or totally made of a low-melting metal alloy, a step of heating at a temperature higher than the melting temperature of the alloy is carried out after consolidation of the resin.

In one form, the heating step is carried out, where appropriate after the above-mentioned cooling.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tooling for manufacturing at least one part of an air deflection cascade for a thrust reverser system of an aircraft nacelle, the tooling comprising:

at least one molding bar extending along a longitudinal direction of the tooling;

at least one molding column for molding a row of vanes, the at least one molding column comprising two opposite lateral sides extending along the longitudinal direction of the tooling and a plurality of molding cavities, each molding cavity is fixed relative to the at least one molding column and includes a first end opposite a second end, with the first end having a first opening defined at one of the lateral sides and the second end having a second opening defined at the other one of the lateral sides, each of the molding cavities configured to mold a vane;

a fixed structure on which the molding bar and the molding column are mounted, the fixed structure allowing a translational movement, along a transverse direction of the tooling, of the molding bar; and at least one compression device that is configured to displace the molding bar towards the at least one molding column to form the at least one part of the air deflection cascade.

2. The tooling according to claim 1, further comprising at least two adjacent molding columns, each molding column being movable in translation, along the transverse direction of the tooling, over the fixed structure of the tooling, the tooling further comprising a second molding bar, the two molding bars being arranged on either side of an assembly formed by the molding columns.

3. The tooling according to claim 2, wherein the second molding bar is mounted movable in translation, along the transverse direction of the tooling, the tooling comprising a second compression device configured to provide the displacement of the second molding bar.

4. The tooling according to claim 2, wherein the second molding bar is fixed with respect to the fixed structure.

5. The tooling according to claim 2, wherein each molding column is set in a fixed configuration, in which each molding column is fixed with respect to the fixed structure of the tooling, and in a movable configuration, in which the molding column is movable in translation along a transverse direction of the tooling, relative to the fixed structure.

6. The tooling according to claim 1, wherein each molding column comprises between 8 and 16 cavities.

7. The tooling according to claim 6, wherein each molding column is made by assembling at least two subassemblies, each subassembly comprising between 4 and 8 cavities.

8. The tooling according to claim 1, further comprising between 4 and 8 molding columns.

9. The tooling according to claim 1, wherein each molding column is rigid.

10. The tooling according to claim 1, wherein the molding cavities of each molding column are non-deformable.

11. The tooling according to claim 1, wherein each molding column is made of a fusible material.

12. The tooling according to claim 1, further comprising a guide system, the guide system comprising rails to guide a movement of the at least one molding bar.

13. A method for manufacturing a thrust reverser cascade for an aircraft nacelle, by compression molding in tooling according to claim 1, the tooling comprising as many molding columns as the thrust reverser cascade to be manufactured comprises rows of vanes and comprising two molding bars, the method comprising:

arranging elements made of a composite material, during which at least one first element intended to form at least partially a spar of the thrust reverser cascade and second elements arranged on either side of each molding column, each second element being intended to form at least partially a vane of the thrust reverser cascade and being arranged opposite a respective cavity of a molding column;

compression, during which a force is applied on at least one of the molding bars, configured to bring together all of the molding columns and the molding bars, and to enable the compression of the elements made of a composite material for each second element to creep in the respective cavity;

consolidation, during which the elements made of a composite material partially or totally harden; and demolding the thrust reverser cascade.

14. The method according to claim 13, wherein the demolding of the thrust reverser cascade further comprises an elimination of the molding columns, by total or partial melting of each molding column.

15. A method for manufacturing a thrust reverser cascade for an aircraft nacelle, by compression molding in tooling according to claim 1, the tooling comprising as many molding columns as the thrust reverser cascade to be manufactured comprises rows of vanes and comprising two molding bars, the method comprising:

arranging elements made of a composite material, during which at least one first element intended to form at least partially a spar of the thrust reverser cascade and a plurality of second elements are arranged on either side of a molding column, each second element configured to form at least partially a vane of the thrust reverser cascade and being arranged opposite a respective cavity of the molding column;

compression, during which a force is applied on at least one of the molding bars, configured to bring together the molding bar and the adjacent molding column, or two adjacent molding columns, and to enable a compression of the elements made of a composite material enough for each second element to creep in the respective cavity;

consolidation, during which the elements made of a composite material partially or totally harden;

the material arrangement, the compression and the consolidation being successively repeated for each adjacent column, so as to add, each time, at least one spar and at least one row of vanes to the part being manufactured, until the part being manufactured comprises all of the spars and the rows of vanes of the thrust reverser cascade to be manufactured; and demolding the thrust reverser cascade.

16. The method according to claim 15, wherein the demolding of the thrust reverser cascade further comprises an elimination of the molding columns, by total or partial melting of each molding column.

* * * * *